United States Patent
Kobayashi et al.

(10) Patent No.: US 10,086,480 B2
(45) Date of Patent: Oct. 2, 2018

(54) FLUX COMPOSITION AND BRAZING SHEET

(71) Applicants: Kobe Steel, Ltd., Kobe-shi (JP); Denso Corporation, Kariya (JP)

(72) Inventors: Nobuhiro Kobayashi, Kobe (JP); Motohiro Horiguchi, Kobe (JP); Koichi Sakamoto, Kobe (JP); Toshiki Ueda, Moka (JP); Shimpei Kimura, Moka (JP); Takahiro Izumi, Moka (JP)

(73) Assignees: Kobe Steel, Ltd., Kobe-shi (JP); DENSO CORPORATION, Kariya (JP)

( * ) Notice: Subject to any disclaimer, the term of this patent is extended or adjusted under 35 U.S.C. 154(b) by 621 days.

(21) Appl. No.: 14/347,080

(22) PCT Filed: Oct. 17, 2012

(86) PCT No.: PCT/JP2012/076842
§ 371 (c)(1),
(2) Date: Mar. 25, 2014

(87) PCT Pub. No.: WO2013/061843
PCT Pub. Date: May 2, 2013

(65) Prior Publication Data
US 2015/0047745 A1    Feb. 19, 2015

(30) Foreign Application Priority Data
Oct. 26, 2011   (JP) .................. 2011-235291

(51) Int. Cl.
*B23K 35/36*    (2006.01)
*B23K 35/28*    (2006.01)
(Continued)

(52) U.S. Cl.
CPC ........ *B23K 35/3605* (2013.01); *B23K 1/0012* (2013.01); *B23K 1/19* (2013.01);
(Continued)

(58) Field of Classification Search
CPC .............................. B23K 35/363; B23K 35/36
(Continued)

(56) References Cited

U.S. PATENT DOCUMENTS

| | | | |
|---|---|---|---|
| 4,689,092 A | 8/1987 | Suzuki et al. | |
| 6,010,578 A | 1/2000 | Ono et al. | |
| 2004/0163734 A1 | 8/2004 | Englert et al. | |

FOREIGN PATENT DOCUMENTS

| | | | | |
|---|---|---|---|---|
| JP | 61-009994 | * | 1/1986 | ........... B23K 35/363 |
| JP | 61-009996 | * | 1/1986 | ........... B23K 35/363 |

(Continued)

OTHER PUBLICATIONS

International Search Report dated Jan. 15, 2013 in PCT/JP12/076842 Filed Oct. 17, 2012.
(Continued)

*Primary Examiner* — Lois Zheng
(74) *Attorney, Agent, or Firm* — Oblon, McClelland, Maier & Neustadt, L.L.P.

(57) ABSTRACT

Disclosed is a flux composition for use in brazing of an aluminum alloy material and includes a flux component [A] containing $KAlF_4$; and a fluoride [B] containing an element other than Group 1 elements and Group 2 elements and containing no potassium (K). Also disclosed is a brazing sheet which includes an aluminum alloy core; a filler material lying on or over at least one side of the core; and a flux layer lying on or over one side of the filler material and including the flux composition.

10 Claims, 2 Drawing Sheets

(51) Int. Cl.
  *B23K 35/02* (2006.01)
  *B23K 1/00* (2006.01)
  *B23K 1/19* (2006.01)
  *B23K 1/20* (2006.01)
  *B23K 35/362* (2006.01)
  *B23K 101/00* (2006.01)
  *B23K 103/10* (2006.01)
  *F28F 21/08* (2006.01)

(52) U.S. Cl.
  CPC .......... *B23K 1/203* (2013.01); *B23K 35/0233* (2013.01); *B23K 35/0238* (2013.01); *B23K 35/286* (2013.01); *B23K 35/36* (2013.01); *B23K 35/361* (2013.01); *B23K 35/362* (2013.01); *B23K 2201/006* (2013.01); *B23K 2203/10* (2013.01); *F28F 21/089* (2013.01); *Y10T 428/273* (2015.01); *Y10T 428/31678* (2015.04)

(58) Field of Classification Search
  USPC .............................................. 148/23, 24, 26
  See application file for complete search history.

(56) References Cited

FOREIGN PATENT DOCUMENTS

| | | |
|---|---|---|
| JP | 61 099569 | 5/1986 |
| JP | 61 162295 | 7/1986 |
| JP | 6-15486 A | 1/1994 |
| JP | 6 190590 | 7/1994 |
| JP | 6-198487 A | 7/1994 |
| JP | 6 285682 | 10/1994 |
| JP | 6 344179 | 12/1994 |
| JP | 8-267229 | 10/1996 |
| JP | 10-211598 A | 8/1998 |
| JP | 2005-125406 A | 5/2005 |
| JP | 2005 518946 | 6/2005 |
| JP | 2008 023553 | 2/2008 |
| JP | 2010-17721 | 1/2010 |

OTHER PUBLICATIONS

Written Opinion of the International Searching Authority dated Jan. 15, 2013 in PCT/JP12/076842 Filed Oct. 17, 2012.

* cited by examiner

FLUX COMPOSITION AND BRAZING SHEET

TECHNICAL FIELD

The present invention relates to a flux composition for the brazing of an aluminum alloy material, and to a brazing sheet using the flux composition.

BACKGROUND ART

With recently increasing concerns about environmental issues, weight reduction has been performed more and more for better fuel efficiency typically in the automobile industry. To meet the requirement in weight reduction, investigations have been made actively so as to allow aluminum clad materials (brazing sheets) for automobile heat exchangers to have a lesser wall thickness and a higher strength. The brazing sheets generally have a three-layer structure including layers of a sacrificial material (e.g., Al—Zn material), a core (e.g., Al—Si—Mn—Cu material), and a filler material (e.g., Al—Si material) laminated in this order. For higher strength, investigations have been made to add magnesium (Mg) to the core, namely to strengthen the core by $Mg_2Si$ precipitation Independently, flux brazing is widely employed for the joining of a brazing sheet to assembly a heat exchanger. The flux contributes to better brazeability, and one containing $KAlF_4$ as a principal component is generally employed.

However, the customary flux, when used in a brazing sheet having a core including a magnesium-containing aluminum alloy disadvantageously adversely affects the brazeability. Upon heating for brazing, magnesium in the core migrates into the flux in the filler material surface and reacts with the flux component to form high-melting-point compounds such as $KMgF_3$ and $MgF_2$. This consumes the flux component and probably causes the disadvantage. To prevent this, a flux composition for a magnesium-containing aluminum alloy should be developed so as to advance the weight reduction typically of automobile heat exchangers.

Under these circumstances, to help a brazing sheet having a magnesium-containing aluminum alloy as a core, there have been made investigations on (1) a flux composition further containing CsF in addition to the customary flux component (see Japanese Unexamined Patent Application Publication (JP-A) No. S61-162295); and (2) a flux composition further containing $CaF_2$, NaF, or LiF in addition to the customary flux component (see JP-A No. S61-99569).

However, the flux composition (1) further containing CsF is not suitable for mass production and is poorly practical, because Cs is very expensive. In turn, the flux composition (2) further containing $CaF_2$ or another specific compound exhibits better fluidity as the flux, because the added compound helps the flux to have a lower melting point. Even this flux composition, however, fails to provide sufficiently better brazeability, because even this flux reacts with magnesium as in the customary technique. Independently, a brazing sheet exhibits better brazeability by applying a flux in a larger mass of coating. However, such larger mass of coating causes higher cost. To prevent this, demands have been made to develop a flux that enables satisfactory brazing with low cost.

CITATION LIST

Patent Literature

PTL 1: JP-A No. S61-162295
PTL 2: JP-A No. S61-99569

SUMMARY OF INVENTION

Technical Problem

The present invention has been made under these circumstances, and an object thereof is to provide a flux composition and a brazing sheet using the flux composition, which flux composition, when used in the brazing of a magnesium-containing aluminum alloy material, can contribute to better brazeability in a small mass of coating.

Solution to Problem

The present inventors focused attention on a cause of brazeability deterioration of a magnesium-containing aluminum alloy; and have found that the brazeability deterioration occurs not only because magnesium and the flux component ($KAlF_4$) react with each other to form magnesium-containing high-melting-point compounds as has been reported, but also because the reaction also forms high-melting-point $K_3AlF_6$. Based on this, the present inventors have found that better brazeability can be obtained by the coexistence of a specific fluoride with the flux component, which specific fluoride can utilize the $K_3AlF_6$ effectively. The present invention has been made based on these findings.

Specifically, to achieve the object, the present invention provides:

a flux composition for the brazing of an aluminum alloy material, the flux composition containing:

[A] a flux component including $KAlF_4$ (hereinafter also simply referred to as a "flux component [A]"); and

[B] a fluoride containing an element other than Group 1 elements and Group 2 elements and containing no K (potassium) (hereinafter also simply referred to as a "fluoride [B]").

The flux composition contains the fluoride [B]. While its mechanism remains insufficiently revealed, the fluoride [B] probably acts as follows. When the flux composition is used in the brazing of a magnesium-containing aluminum alloy material, the fluoride [B] probably reacts with $K_3AlF_6$ to form $KAlF_4$, which $K_3AlF_6$ is formed during brazing. Accordingly, the flux composition resists reduction in $KAlF_4$ necessary for better brazeability and, even when present in a small mass of coating, can contribute to better brazeability. The flux composition is also applicable to the brazing of an aluminum alloy material containing no magnesium and is usable in wide applications. When the flux component [A] preferentially reacts with the fluoride [B] prior to the reaction with magnesium during brazing/heating, the flux probably has a melting point being varied. However, simple lowering of the flux melting point does not effectively contribute to better brazeability, as is described above. In contrast, elevation in melting point of the flux obviously reduces the flux fluidity and adversely affects the brazeability. These suggest that it is effective to allow the fluoride [B] to exist as separated particles which have poor reactivity with the flux component [A] and which are not premelted.

In a preferred embodiment, the fluoride [B] is $AlF_3$. The use of $AlF_3$ as the fluoride [B] as in this embodiment contributes to more efficient formation of $KAlF_4$ from $K_3AlF_6$.

In another preferred embodiment, the flux composition has a melting point of 580° C. or lower. Inhibition of the flux composition from having a higher melting point as in this embodiment helps the flux composition to exhibit further better brazeability.

In still another preferred embodiment, the flux composition contains particles including the flux component [A]; and particles including the fluoride [B]. The flux component [A] and the fluoride [B], when included in different particles from each other as in this embodiment, contributes to inhibition of elevation in melting point of the flux component [A] by the presence of the fluoride [B]. This helps the flux composition to exhibit better brazeability effectively.

In another preferred embodiment, the flux composition contains the fluoride [B] in a content of from 1 part by mass to 200 parts by mass per 100 parts by mass of the flux component [A]. The fluoride [B], when contained in a content within the above-specified range, can contribute to further better brazeability.

In another preferred embodiment, the flux composition further contains a melting-point-lowering agent [C]. The melting-point-lowering agent [C], when contained in the flux composition as in this embodiment, can prevent the flux component [A] from having a higher melting point and can contribute to further better brazeability.

In another preferred embodiment, the melting-point-lowering agent [C] is at least one compound selected from the group consisting of NaF and LiF. The compound, when used as the melting-point-lowering agent [C], can more effectively prevent the flux component [A] from having a higher melting point.

In another preferred embodiment, the melting-point-lowering agent [C] is contained in a content of from 1 part by mass to 30 parts by mass per 100 parts by mass of the flux component [A]. The melting-point-lowering agent [C], when contained in a content within the above-specified range as in this embodiment, can contribute to further better brazeability.

A brazing sheet according to the present invention includes a core including an aluminum alloy; a filler material lying on at least one side of the core; and a flux layer lying on one side of the filler material and including the flux composition. The brazing sheet, as employing the flux composition, exhibits satisfactory brazeability.

In a preferred embodiment, the flux composition constituting the flux layer is present in a mass of deposition of from 0.5 $g/m^2$ to 100 $g/m^2$ in terms of solids content. The brazing sheet according to this embodiment employs the flux composition in a small amount within the above-specified range and can save the production cost while exhibiting satisfactory brazeability.

In another preferred embodiment, the aluminum alloy contains magnesium. The brazing sheet according to this embodiment employs such magnesium-containing aluminum alloy as the core and can thereby have a lighter weight. In turn, this brazing sheet employs the flux layer formed from the flux composition and can exhibit satisfactory brazeability even employing the magnesium-containing aluminum alloy.

Advantageous Effects of Invention

As has been described above, the flux composition according to the present invention is widely usable in the brazing of an aluminum alloy material regardless of whether it contains magnesium or not. In particular, the flux composition, when used in the brazing of a magnesium-containing aluminum alloy material, can contribute to better brazeability even when used in a small mass of coating. The brazing sheet according to the present invention employs the flux composition and exhibits satisfactory brazeability. The brazing sheet according to the present invention therefore gives, through brazing, a structure that can have both a high strength and a lighter weight and is usable typically as or in an automobile heat exchanger.

DESCRIPTION OF EMBODIMENTS

Figure 1:
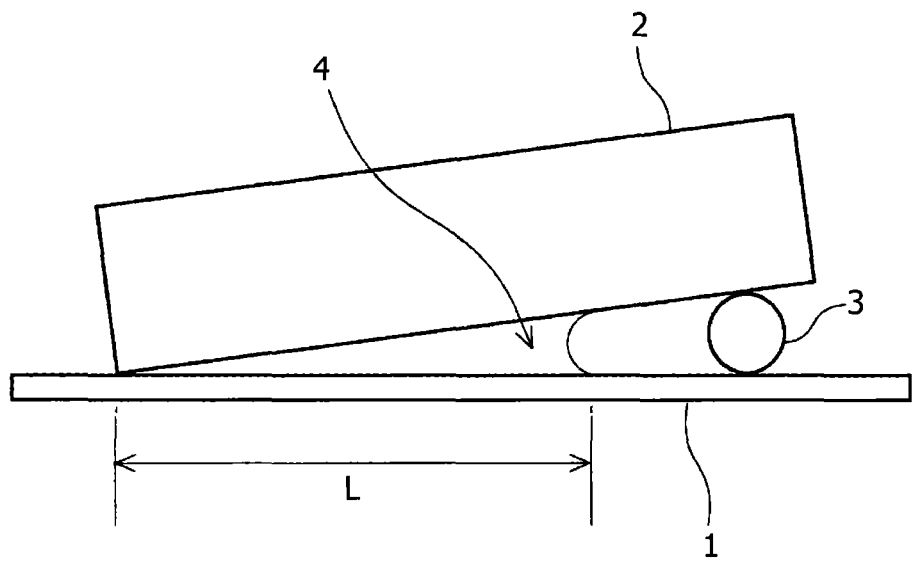
FIG. 1 is a schematic view illustrating an evaluation method in working examples.

The flux composition and the brazing sheet each according to the present invention will be sequentially described in detail below.

Flux Composition

The flux composition according to the present invention is used in the brazing of an aluminum alloy material. The flux composition contains a flux component [A] including $KAlF_4$; and a fluoride [B] including an element other than Group 1 elements and Group 2 elements and including no potassium (K).

The flux composition contains the fluoride [B]. When the flux composition is used in the brazing of a magnesium-containing aluminum alloy material, the fluoride [B] probably reacts with $K_3AlF_6$ to form $KAlF_4$, which $K_3AlF_6$ is formed during brazing. The flux composition can therefore prevent $KAlF_4$ from decreasing and can contribute to better brazeability even it is used in a small mass of coating, because $KAlF_4$ is necessary for better brazeability. In addition, the fluoride [B] does not impede brazing by the action of the flux component [A]. This helps the flux composition to be usable even in the brazing of an aluminum alloy material containing no magnesium and to be usable in wide applications. The respective components will be illustrated below.

Flux Component [A]

The flux component [A] is not limited, as long as being a brazing flux component containing $KAlF_4$. The flux component [A] exhibits the functions of melting preferentially to the filler material components during heating and temperature rise process upon brazing to remove an oxide film on the aluminum alloy material surface; and of covering the aluminum alloy material surface to prevent aluminum from reoxidation.

The flux component [A] may further include one or more components in addition to $KAlF_4$. The other components than $KAlF_4$ are not limited and exemplified by those to be contained in known flux components. Such optional components are exemplified by other fluorides such as KF, $K_2AlF_5$, and $K_3AlF_6$; and hydrates such as $K_2(AlF_5)(H_2O)$. Of the other components, $K_2AlF_5$, for example, reacts with magnesium (Mg) during brazing/heating to form $K_3AlF_6$. The resulting $K_3AlF_6$ reacts with the fluoride [B] to form $KAlF_4$ and probably contributes to better brazeability as described above. A similar effect is probably exhibited when $K_3AlF_6$ is inherently present in the flux component [A], because $K_3AlF_6$ can react with the fluoride [B]. Even when other component or components than the essential component $KAlF_4$ are contained, the advantageous effects of the present invention can probably be exhibited by allowing the fluoride [B] to exist in such a state where $K_3AlF_6$ is formed or is present, as mentioned above.

The flux component [A] may contain $KAlF_4$ in a content not critical, but preferably 50 percent by volume or more, and more preferably 70 percent by volume or more.

The flux component [A] may exist in a form not critical, but preferably exists as particles including the flux component [A]. More preferably, the flux component [A] exists as particles including no fluoride [B] (e.g., particles including the flux component [A] alone). The particles herein may have any shape such as a spherical or amorphous (indefinite) shape. If particles including both the flux component [A] and the fluoride [B] are used, the presence of the fluoride [B] may cause the flux component [A] to have a higher melting point. The separation of the flux component [A] from the fluoride [B] into different particles prevents the flux component [A] from having a higher melting point, and this results in further better brazeability.

The flux composition has a melting point, if risen, higher than the melting point of the flux component [A] preferably by 15° C. or less, and more preferably by 10° C. or less. The flux composition has a melting point of preferably 580° C. or lower, and more preferably 570° C. or lower in terms of upper limit. The flux composition, when controlled not to have a higher melting point in this manner, can exhibit further better brazeability. The lower limit of the flux composition melting point is not limited, but can typically be 520° C. and is preferably 540° C.

Fluoride [B]

The fluoride [B] is not limited, as long as being a fluoride containing an element other than Group 1 elements (hydrogen, lithium, sodium, potassium, rubidium, cesium, and francium) and Group 2 elements (beryllium, magnesium, calcium, strontium, barium, and radium) and containing no K (potassium). However, the fluoride [B] is preferably such a component that can react with $K_3AlF_6$ to form $KAlF_4$, which $K_3AlF_6$ is a high-melting-point compound formed during brazing of a magnesium-containing aluminum alloy material, while the mechanism thereof is still insufficiently revealed.

The fluoride [B] is exemplified by $AlF_3$, $CeF_3$, and $BaF_2$. Of such fluorides, preferred are fluorides containing any of Group 13 elements (e.g., boron, aluminum, gallium, and indium), of which aluminum-containing fluorides are more preferred. Fluorides of Group 13 elements are also more preferred. Among them, $AlF_3$ is particularly preferred. $AlF_3$, when used, enables more efficient formation of $KAlF_4$ from $K_3AlF_6$. $AlF_3$ may be a hydrate, but is preferably an anhydride.

The upper limit of the fluoride [B] content is not critical, but is preferably 200 parts by mass, more preferably 100 parts by mass, and furthermore preferably 60 parts by mass, per 100 parts by mass of the flux component [A]. The fluoride [B], if contained in a content higher than the upper limit, causes a relatively lower content of the flux component [A], and this might adversely affect the brazeability.

The lower limit of the fluoride [B] content is also not critical, but is preferably 1 part by mass, more preferably 2 parts by mass, and furthermore preferably 10 parts by mass, per 100 parts by mass of the flux component [A]. The fluoride [B], if contained in a content lower than the lower limit, might fail to contribute to advantageous effects of the present invention sufficiently.

The fluoride [B] may exist in any form not critical, but preferably exist as particles including the fluoride [B]. The fluoride [B] more preferably exist as particles including no flux component [A] (e.g., particles including the fluoride [B] alone). The particles may have any shape not critical, such as spherical or indefinite shape. As is described above, separation of the flux component [A] from the fluoride [B] into different particles can prevent the flux component [A] from having a higher melting point and contributes to further better brazeability.

Melting-Point-Lowering Agent [C]

The flux composition preferably further contains a melting-point-lowering agent [C]. The flux composition, when further containing the melting-point-lowering agent [C], can prevent the flux component [A] from having a higher melting point and can have further better brazeability.

The melting-point-lowering agent [C] is a compound having the effect of suppressing melting point rise of the flux component [A]. The melting-point-lowering agent [C] is not limited, as long as having the effect, but is exemplified by fluorides of alkali metals and alkaline earth metals other than potassium, such as NaF, LiF, CsF, and $CaF_2$. Among them, alkali metal fluorides are preferred, of which NaF and LiF are more preferred. NaF and LiF, when used, can contribute to better brazeability by allowing the flux component [A] to have a lower melting point while suppressing cost rise. Each of different melting-point-lowering agents may be used alone or in combination.

The upper limit of the melting-point-lowering agent [C] content is not critical, but is preferably 30 parts by mass, and more preferably 20 parts by mass, per 100 parts by mass of the flux component [A]. The melting-point-lowering agent [C], if contained in a content higher than the upper limit, causes a relatively lower content of the flux component [A], and this might adversely affect the brazeability.

The lower limit of the melting-point-lowering agent [C] content is also not critical, but is preferably 0.1 part by mass, more preferably 0.5 part by mass, and furthermore preferably 1 part by mass, per 100 parts by mass of the flux component [A]. The melting-point-lowering agent [C], if contained in a content lower than the lower limit, might fail to exhibit its effects sufficiently.

The upper limit of the melting-point-lowering agent [C] content is preferably 200 parts by mass, and more preferably 100 parts by mass, per 100 parts by mass of the fluoride [B]. The melting-point-lowering agent [C], if contained in a content higher than the upper limit, causes a relatively lower content of the fluoride [B], and this might prevent the flux composition from exhibiting advantageous effects of the present invention.

The lower limit of the melting-point-lowering agent [C] content is preferably 0.1 part by mass, and more preferably 1 part by mass, per 100 parts by mass of the fluoride [B]. The melting-point-lowering agent [C], if contained in a content lower than the lower limit, might fail to exhibit its effects sufficiently.

The melting-point-lowering agent [C] may exist in any form not limited, but generally exists as particles. The particles have any shape not limited, such as spherical or indefinite shape.

The flux composition may further contain one or more additional components in addition to the flux component [A], the fluoride [B], and the melting-point-lowering agent

[C], within ranges not adversely affecting advantageous effects of the present invention.

The flux composition may be in any form or state not critical, but is generally powdery. However, the flux composition may also be in any other form such as solid or paste.

The flux composition may be manufactured by any method not limited and may be manufactured typically by mixing the flux component [A], the fluoride [B], and, where necessary, optional components such as the melting-point-lowering agent [C] in a suitable ratio. A technique for the mixing is exemplified by techniques (1), (2), and (3) as follows: (1) a technique of simply mixing respective powdery components with each other to give a powdery flux composition; (2) a technique of mixing respective powdery components to give a mixture, heating and melting the mixture typically in a crucible, and cooling the resulting mixture to give a solid or powdery flux composition; and (3) a technique of suspending respective powdery components in a solvent such as water to give a paste or slurry flux composition.

The techniques (1) and (3) are preferred so as to obtain a flux composition containing particles separately including the flux component [A]; and particles including the fluoride [B], as described above.

Use Method of Flux Composition

A method of using the flux composition according to the present invention (brazing method using the flux composition according to the present invention) will be illustrated below. The flux composition according to the present invention exhibits satisfactory brazeability even in a small mass of coating and, as a result, enables economical brazing.

An aluminum alloy material to be brazed with the flux composition is not limited and may contain magnesium or not. However, to achieve the material weight reduction and to allow the flux composition to exhibit effects more sufficiently, the aluminum alloy material is preferably a magnesium-containing aluminum alloy. The aluminum alloy material may be a material including an aluminum alloy alone or a multilayer composite material (e.g., a brazing sheet) having an aluminum alloy layer and a layer including another material.

When the aluminum alloy material (aluminum alloy) contains magnesium, the upper limit of the magnesium content is preferably 1.5 percent by mass, more preferably 1.0 percent by mass, and particularly preferably 0.5 percent by mass. Magnesium, when contained in a content higher than the upper limit, may prevent the flux composition from exhibiting brazeability sufficiently. The lower limit of the magnesium content in the aluminum alloy material (aluminum alloy) is not critical and is typically 0.01 percent by mass.

A filler material for use in the brazing method is not limited and can be a known one. The filler material preferably has a melting point higher than that of the flux component [A] by about 10° C. to about 100° C. Exemplary filler materials of this type include Al—Si alloys, of which Al—Si alloys having a Si content of from 5 parts by mass to 15 parts by mass are more preferred. Such Al—Si alloys (filler materials) may further contain one or more of other elements such as Zn and Cu.

The flux composition may be applied to a brazing portion by any technique not limited. The technique is exemplified by a technique of applying a powdery flux as intact to the brazing portion; and a technique of coating or immersing the brazing portion with or in a slurry or paste flux composition, and evaporating a dispersion medium component to allow the flux composition alone to deposit on the brazing portion.

The dispersion medium component is generally water, but can also be an organic solvent such as an alcohol.

The lower limit of the mass of coating of the flux composition onto the brazing portion is preferably 0.5 g/m$^2$, and more preferably 1 g/m$^2$ in terms of solids content. The flux composition, when present in a mass of coating controlled to the lower limit or more, can exhibit sufficient brazeability. In contrast, the upper limit of the mass of coating of the flux composition is preferably 100 g/m$^2$, more preferably 60 g/m$^2$, furthermore preferably 20 g/m$^2$, and particularly preferably 10 g/m$^2$ in terms of solids content. The flux composition, when present in a mass of coating controlled to the upper limit or less, can be used in a controlled amount to achieve cost reduction while maintaining brazeability at certain level.

After being coated with the flux composition as a suspension (slurry or paste), the brazing portion is generally dried. Brazing is then performed by heating the brazing portion to melt the flux component and the filler material. The heating herein is performed at a temperature (e.g., from 580° C. to 615° C.) lower than the melting point of the core aluminum alloy and higher than the melting point of the flux.

The heating may be performed at a rate of temperature rise of typically from about 10° C. to about 100° C. per minute. Though not critical, the heating time is preferably short so as to reduce the amount of magnesium migration that adversely affect the brazeability. The heating time is typically from about 5 to 20 minutes.

The heating may be performed under known ambient conditions and is preferably performed in a non-oxidizing atmosphere such as an inert gas atmosphere. The heating may be performed at an oxygen concentration of preferably 1,000 ppm or less, more preferably 400 ppm or less, and furthermore preferably 100 ppm or less from the viewpoint of oxidation suppression. The heating is preferably performed in an atmosphere with a dew point of −35° C. or lower.

The flux composition is also usable in the brazing of an aluminum alloy material containing no magnesium. The flux composition is also usable as a flux layer of a brazing sheet including an aluminum alloy core containing no magnesium.

Brazing Sheet

The brazing sheet according to the present invention includes an aluminum alloy core; a filler material lying on or over at least one side of the core; and a flux layer lying on or over one side (surface) of the filler material and including the flux composition. Exemplary layer structures between the core and the filler material in the brazing sheet include structures having three or more layers, such as a structure of [filler material/core/filler material] (three-layer structure with both-sided filler material); and a structure of [filler material/core/intermediate layer/filler material] (four-layer structure).

The brazing sheet has a flux layer including the flux composition on a surface of a filler material. This can inhibit KAlF$_4$ from decreasing during brazing even when the brazing sheet employs a magnesium-containing aluminum alloy core, which decreasing is associated with the formation of high-melting-point compounds derived from magnesium in the core. The brazing sheet can therefore exhibit better brazeability.

The core is not limited, as long as including an aluminum alloy, but preferably includes a magnesium-containing aluminum alloy. The brazing sheet, when employing a magnesium-containing aluminum alloy as the core, can have a lighter weight. In turn, the brazing sheet has a flux layer formed from the flux composition and can thereby exhibit superior brazeability even when the magnesium-containing aluminum alloy is employed. The magnesium-containing aluminum alloy, when used as the core, preferably has a magnesium content falling within the range specified in the aluminum alloy material.

The filler material is exemplified by those listed in the use method of the flux composition.

The flux layer is a layer including (formed from) the flux composition. The flux layer may be formed by any method not limited, but is formed typically by a method of applying the flux composition in the form of powder, slurry, or paste to the filler material surface.

The lower limit of the mass of deposition (mass of coating) of the flux composition in the flux layer is not critical, but is preferably 0.5 g/m$^2$, and more preferably 1 g/m$^2$. The flux composition, when present in a mass of deposition controlled to the lower limit or more, can exhibit sufficient brazeability. In contrast, the upper limit of the mass of deposition of the flux composition is preferably 100 g/m$^2$, more preferably 60 g/m$^2$, furthermore preferably 20 g/m$^2$, and particularly preferably 10 g/m$^2$. The flux composition, when present in a mass of deposition controlled to the upper limit or less, can be used in such a small amount and achieve cost reduction while maintaining brazeability at certain level.

The brazing sheet may have any dimensions and can employ any known dimensions typically in the core. For example, the brazing sheet can have a thickness of typically from 0.1 mm to 2 mm. The brazing sheet may be manufactured by any method not limited and can be manufactured by a known method.

The brazing sheet may further include a sacrificial material (sacrificial alloy) that lies on or over the other side of the core and has a potential baser than that of the core. The brazing sheet, when including the sacrificial material, can have further better corrosion resistance.

A material constituting the sacrificial material is not limited, as long as having a potential baser than that of the core. The material is exemplified by Al—Zn alloys having a Zn content of from 1 to 10 percent by mass; and Al alloys having a Si content of from 0.5 to 1.1 percent by mass, a Mn content of 2.0 percent by mass or less, and a Zn content of from 0.6 to 2.0 percent by mass.

Use Method of Brazing Sheet According to Present Invention

The brazing sheet can be used (brazed) by a known method. Heating conditions (e.g., temperature, rate of temperature rise, and oxygen concentration) for brazing of the brazing sheet are exemplified by the conditions described in the brazing method as above.

Structure

A structure formed through brazing of an aluminum alloy material using the flux composition or formed from the brazing sheet has a firmly joined brazing portion. The structure can therefore have both a high strength and a lighter weight as a structure using an aluminum alloy material (preferably using a magnesium-containing aluminum alloy).

Specifically, the structure is exemplified by automobile heat exchangers such as radiators, evaporators, and condensers. The heat exchangers, as employing a brazing sheet preferably including a magnesium-containing aluminum alloy material (core), can have a higher strength and a smaller wall thickness. The heat exchangers, as employing the flux composition according to the present invention, have superior brazeability and are firmly brazed.

EXAMPLES

The present invention will be illustrated in further detail with reference to working examples below. It should be noted, however, that these examples are by no means intended to limit the scope of the invention.

Examples 1 to 24 and Comparative Examples 1 to 4

Flux compositions were prepared by adding and suspending a flux component [A], a fluoride [B], and a melting-point-lowering agent [C] in mass proportions given in Table 1 into 100 mL of ion-exchanged water. The flux component [A] used herein was particles including 80 percent by volume of $KAlF_4$ and 20 percent by volume of $K_2(AlF_5)$ ($H_2O$). The fluoride [B] used herein was $AlF_3$ in the form of particles ($AlF_3$particles). The melting-point-lowering agent [C] used herein was NaF or LiF each in the form of powder.

Each of the above-prepared flux compositions was applied to a brazing sheet substrate surface (filler material surface) in a mass of coating (in terms of solids content) given in Table 1, dried, and thereby formed a flux layer. This gave brazing sheets according to Examples 1 to 24 and Comparative Examples 1 to 4. To apply the respective powdery components uniformly, the flux composition as a suspension was applied, from which ion-exchanged water was removed by drying. The brazing sheet substrate used in Examples 1 to 21 and Comparative Examples 1 to 3 was one including a sacrificial material; a core including an aluminum alloy having a magnesium content of 0.4 percent by mass; and a filler material (JIS 4045, clad percentage: 10%) lying on a surface of the core. The brazing sheet substrate used in Examples 22 to 24 and Comparative Example 4 was one including a sacrificial material; a core including aluminum containing no magnesium; and a filler material (JIS 4045, clad percentage: 10%) lying on a surface of the core. These brazing sheet substrates each had a thickness of 0.4 mm.

Evaluation

The brazeability of each of the prepared brazing sheets was evaluated by a method according to Japan Light Metal Welding & Construction Association Standard LWS T8801. The specific evaluation method will be illustrated below with reference to FIG. 1. The prepared brazing sheet was placed stand as a lower sheet 1 so that the flux layer faced upward. A 1.0-mm thick 3003 Al alloy (base metal) was stood as an upper sheet 2 on the top surface of the lower sheet. A special-use stainless steel (SUS) rod-like spacer 3 was placed between the lower sheet 1 and one end of the upper sheet 2 to provide a clearance between the lower sheet 1 and the one end of the upper sheet 2.

The specimen in this state was subjected to a clearance fillability test. Specifically, brazing of the lower sheet 1 with the upper sheet 2 was performed by heating at 600° C. for 10 minutes in an atmosphere with a dew point of −40° C. and an oxygen concentration of 100 ppm or less. The temperature was risen from mom temperature up to 600° C. at an average rate of temperature rise of 50° C. per minute. The length (fillet-forming length L) of a fillet 4 formed by the brazing/heating was measured, and the fillet-forming length L was employed as an index for brazeability. A specimen exhibits better brazeability with an increasing fillet-forming length L. Table 1 indicates evaluation results (fillet-forming lengths).

Separately, the melting point of each flux composition was measured with TG8120 supplied by Rigaku Corporation. Table 1 indicates measurement results. As used herein the term "melting point" refers to a melting start temperature of the flux composition.

mens had a longer fillet-forming length and exhibited better brazeability with an increasing content of the fluoride [B].

Figure 3:
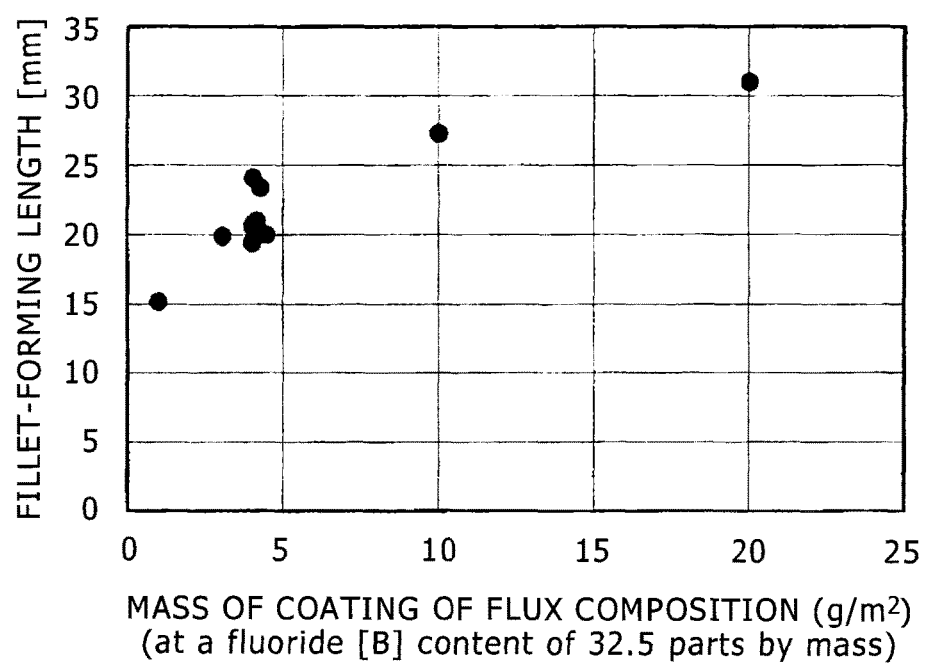
FIG. 3 is a graph illustrating an evaluation result (2) in working examples.

FIG. 3 illustrates how the fillet-forming length varies depending on the mass of coating of a flux composition (having a content of the fluoride [B] of 32.5 parts by mass). FIG. 3 demonstrates that the specimens had a longer fillet-forming length and exhibited better brazeability with an increasing mass of coating of the flux composition. How-

TABLE 1

|  | Core | [B] | [C] | | Mass of | | Flux |
|---|---|---|---|---|---|---|---|
|  | Mg content mass percent | [A] — Part by mass | $AlF_3$ content Part by mass | NaF content Part by mass | LiF content Part by mass | coating of flux composition $g/m^2$ | Fillet-forming length mm | composition melting point ° C. |
| Example 1 | 0.4 | 100 | 3 | 0 | 0 | 3.10 | 7.4 | 562 |
| Example 2 | 0.4 | 100 | 15 | 0 | 0 | 3.45 | 15.2 | 562 |
| Example 3 | 0.4 | 100 | 32.5 | 0 | 0 | 4.01 | 19.5 | 563 |
| Example 4 | 0.4 | 100 | 56 | 0 | 0 | 4.60 | 18.3 | 564 |
| Example 5 | 0.4 | 100 | 15 | 9.6 | 0 | 3.68 | 10.6 | 562 |
| Example 6 | 0.4 | 100 | 32.5 | 3.2 | 0 | 4.10 | 20.5 | 561 |
| Example 7 | 0.4 | 100 | 32.5 | 6.8 | 0 | 4.16 | 21.0 | 561 |
| Example 8 | 0.4 | 100 | 32.5 | 1.07 | 0 | 4.26 | 23.4 | 560 |
| Example 9 | 0.4 | 100 | 32.5 | 15.2 | 0 | 4.45 | 20.0 | 559 |
| Example 10 | 0.4 | 100 | 56 | 12.3 | 0 | 5.06 | 18.5 | 563 |
| Example 11 | 0.4 | 100 | 32.5 | 0 | 0.5 | 4.00 | 19.4 | 562 |
| Example 12 | 0.4 | 100 | 32.5 | 0 | 1.1 | 4.01 | 20.6 | 561 |
| Example 13 | 0.4 | 100 | 32.5 | 0 | 1.8 | 4.03 | 24.1 | 560 |
| Example 14 | 0.4 | 100 | 32.5 | 0 | 2.5 | 4.05 | 20.8 | 559 |
| Example 15 | 0.4 | 100 | 3 | 0 | 0 | 3.06 | 7.8 | — |
| Example 16 | 0.4 | 100 | 15 | 0 | 0 | 3.03 | 16.2 | — |
| Example 17 | 0.4 | 100 | 32.5 | 0 | 0 | 3.05 | 19.9 | — |
| Example 18 | 0.4 | 100 | 56 | 0 | 0 | 3.00 | 22.0 | — |
| Example 19 | 0.4 | 100 | 32.5 | 0 | 0 | 1.00 | 15.2 | — |
| Example 20 | 0.4 | 100 | 32.5 | 0 | 0 | 10.00 | 27.3 | — |
| Example 21 | 0.4 | 100 | 32.5 | 0 | 0 | 20.00 | 31.0 | — |
| Example 22 | 0 | 100 | 32.5 | 0 | 0 | 4.03 | 31.0 | — |
| Example 23 | 0 | 100 | 32.5 | 1.07 | 0 | 4.31 | 30.0 | — |
| Example 24 | 0 | 100 | 32.5 | 0 | 1.8 | 3.99 | 30.3 | — |
| Comp. Ex. 1 | 0.4 | 100 | 0 | 0 | 0 | 3.00 | 3.4 | 562 |
| Comp. Ex. 2 | 0.4 | 100 | 0 | 8.6 | 0 | 3.25 | 3.4 | — |
| Comp. Ex. 3 | 0.4 | 100 | 0 | 0 | 0.5 | 3.01 | 3.6 | — |
| Comp. Ex. 4 | 0 | 100 | 0 | 0 | 0 | 3.00 | 31.2 | — |

Data in Table 1 demonstrate that brazing sheets using flux compositions according to the present invention each had a long fillet-forming length and exhibited superior brazeability. In particular, the data demonstrate that the brazing sheets according to the present invention, even when the flux composition was present in a small mass of coating as in Example 19, had a longer fillet-forming length than that of a customary sample (Comparative Example 1) in which the flux composition was present in a mass of coating as much as three times that of Example 19. Specifically, the present invention can exhibit sufficient advantageous effects even when the flux composition is present in a small mass of coating. In addition, the brazing sheets using the flux compositions according to the present invention were also very versatile because of employing an inexpensive fluoride as the fluoride [B]. The data also demonstrate that the fluxes according to Examples were protected from having a higher melting point as compared to Comparative Example 1 containing the flux component [A] alone. The data of Examples 22 to 24 and Comparative Example 4 demonstrate that the flux compositions according to the present invention were usable also for aluminum containing no magnesium in the same manner as with the customary flux.

Figure 2:
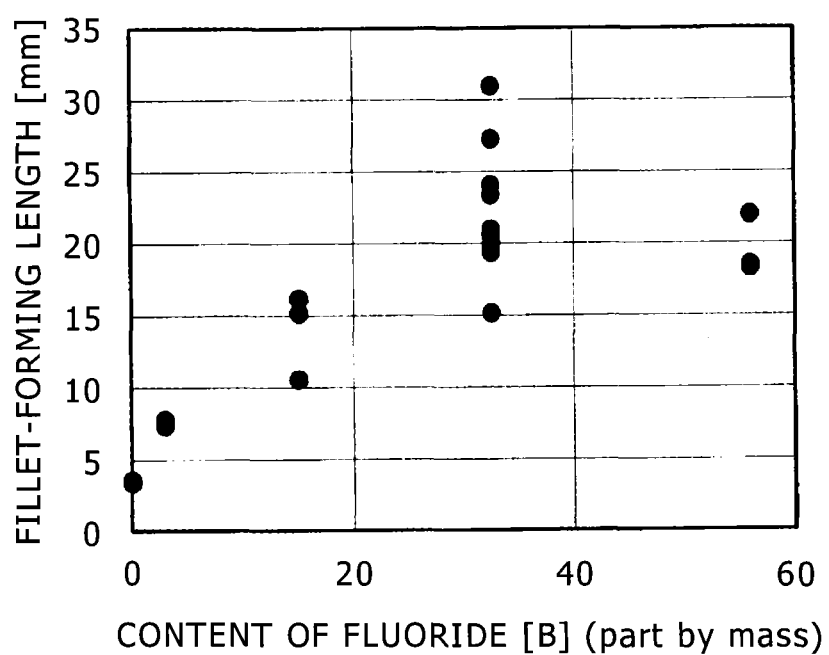
FIG. 2 is a graph illustrating an evaluation result (1) in working examples.

FIG. 2 illustrates how the fillet-forming length varies depending on the content of the fluoride [B] as plotted based on the Example results. FIG. 2 demonstrates that the speciever, as has been demonstrated above, the brazing sheets had sufficient brazeability even when the flux composition was present in a small mass of coating.

While the present invention has been described in detail with reference to embodiments and examples thereof it will be understood by those skilled in the art that the embodiments and examples are never construed to limit the scope of the invention; and that various changes and modifications are possible without departing from the spirit and scope of the invention as set out in the appended claims. The present application is based on Japanese Patent Application No. 2011-235291 filed on Oct. 26, 2011, the entire contents of which are incorporated herein by reference.

INDUSTRIAL APPLICABILITY

The flux composition according to the present invention is advantageously usable in the brazing of an aluminum alloy, particularly a magnesium-containing aluminum alloy. Specifically, the flux composition is usable typically in manufacturing of aluminum alloy heat exchangers for automobile use.

REFERENCE SIGNS LIST 1 lower sheet
2 upper sheet 3 spacer
4 fillet
L fillet-forming length

The invention claimed is:

1. A flux composition, consisting of:
   a flux component consisting of $KAlF_4$ and at least one of $K_2AlF_5$ and $K_2(AlF_5)(H_2O)$; and
   $AlF_3$;
   wherein the $AlF_3$ is present in an amount of at least 3 parts by mass per 100 parts by mass of the flux component.

2. The flux composition according to claim 1, wherein the composition has a melting point of 580° C. or lower.

3. A flux composition, consisting of:
   particles consisting of $KAlF_4$ and at least one of $K_2AlF_5$ and $K_2(AlF_5)(H_2O)$; and
   particles consisting of $AlF_3$;
   wherein the $AlF_3$ is present in an amount of at least 3 parts by mass per 100 parts by mass of the flux component.

4. The flux composition according to claim 1, wherein the $AlF_3$ is present in an amount of up to 200 parts by mass per 100 parts by mass of the flux component.

5. A flux composition, consisting of:
   a flux component consisting of $KAlF_4$ and at least one of $K_2AlF_5$ and $K_2(AlF_5)(H_2O)$;
   $AlF_3$; and
   at least one melting-point-lowering agent selected from the group consisting of NaF and LiF;
   wherein the $AlF_3$ is present in an amount of at least 3 parts by mass per 100 parts by mass of the flux component.

6. The flux composition according to claim 5, wherein the melting-point-lowering agent is present in an amount of from 0.1 part by mass to 30 parts by mass per 100 parts by mass of the flux component.

7. A brazing sheet comprising:
   a core comprising an aluminum alloy;
   a filler material lying on or over a side of the core; and
   a flux layer lying on or over one side of the filler material and comprising the flux composition according to claim 1.

8. The brazing sheet according to claim 7, wherein the flux composition constituting the flux layer is present in a mass of deposition of from 0.5 g/m² to 100 g/m² in terms of solids content.

9. The brazing sheet according to claim 7, wherein the aluminum alloy comprises magnesium.

10. A method, comprising brazing an aluminum alloy material with the flux composition according to claim 1.

* * * * *